United States Patent
Govaerts et al.

(10) Patent No.: US 6,710,108 B2
(45) Date of Patent: Mar. 23, 2004

(54) FLAME-RETARDANT POLYESTER COMPOSITION, METHOD FOR THE PREPARATION THEREOF, AND ARTICLES DERIVED THEREFROM

(75) Inventors: Luc Govaerts, Mt Vernon, IN (US); Sapna Halim Talibuddin, Mt. Vernon, IN (US); Gerrit de Wit, Ossendrecht (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,409

(22) Filed: Aug. 30, 2001

(65) Prior Publication Data

US 2003/0073763 A1 Apr. 17, 2003

(51) Int. Cl.$^7$ ............... C08J 5/10; C08K 5/34; C08L 31/08
(52) U.S. Cl. ............ 524/101; 524/127; 524/138; 524/139; 524/492; 524/430; 524/437; 524/497; 524/445; 524/449
(58) Field of Search .................. 524/101, 127, 524/138, 148, 139, 492, 493, 494, 430, 437, 449, 445, 451, 497

(56) References Cited

U.S. PATENT DOCUMENTS

| 2,465,319 A | 3/1949 | Whinfield et al. |
| 3,047,539 A | 7/1962 | Pengilly |
| 3,950,301 A | 4/1976 | Balog et al. |
| 3,953,404 A | 4/1976 | Borman |
| 4,043,981 A | 8/1977 | O'Brien |
| 4,180,496 A | 12/1979 | Yanagimoto et al. |
| 4,185,008 A * | 1/1980 | Caspari et al. ........ 260/45.8 A |
| 4,578,408 A | 3/1986 | Matsuoka et al. |
| 4,619,954 A | 10/1986 | Warner, II |
| 4,713,407 A | 12/1987 | Bailey et al. |
| 4,741,864 A | 5/1988 | Avakian et al. |
| 4,940,745 A | 7/1990 | Lausberg et al. |
| 5,221,704 A | 6/1993 | Shimotsuma et al. |
| 5,300,621 A | 4/1994 | Inata et al. |
| 5,596,049 A | 1/1997 | Gallucci et al. |
| 5,684,071 A | 11/1997 | Mogami et al. |
| 5,770,644 A | 6/1998 | Yamamoto et al. |
| 6,146,557 A | 11/2000 | Inata et al. |
| 6,187,848 B1 | 2/2001 | Pixton et al. |
| 6,228,912 B1 * | 5/2001 | Campbell et al. ........ 524/100 |

FOREIGN PATENT DOCUMENTS

| DE | 198 37 687 A1 | 2/2000 | |
| EP | 0 338 434 A2 | 10/1989 | |
| EP | 0 791 634 A2 | 8/1997 | |
| EP | 0 955 333 A2 | 11/1999 | |
| JP | 2127517 | 5/1990 | |
| JP | 4106154 | 4/1992 | |
| JP | 1993070671 A | 3/1993 | ........ C08L/67/02 |
| JP | 94157880 A | 6/1994 | ........ C08L/67/02 |

* cited by examiner

Primary Examiner—James J. Seidleck
Assistant Examiner—U. K Rajguru
(74) Attorney, Agent, or Firm—Oppedahl & Larson LLP

(57) ABSTRACT

A polyester composition includes a poly(butylene terephthalate), a nitrogen-containing flame retardant, and a phosphorus-containing flame retardant, such that the weight ratio of the total of the nitrogen-containing flame retardant and the phosphorus-containing flame retardant to poly (butylene terephthalate resin) is at least about 0.70, and the weight ratio of the phosphorus-containing flame retardant to the nitrogen-containing flame retardant is at least about 1.0. The compositions have excellent color stability under ultra-violet light aging, good flame retardance, and high impact strength.

40 Claims, No Drawings

FLAME-RETARDANT POLYESTER COMPOSITION, METHOD FOR THE PREPARATION THEREOF, AND ARTICLES DERIVED THEREFROM

BACKGROUND OF INVENTION

Thermoplastic polyester compositions, such as poly(alkylene terephthalates), have valuable characteristics including strength, toughness, high gloss, and solvent resistance. Polyesters therefore have utility as materials for a wide range of applications, from automotive parts to electric and electronic appliances. Because of their wide use, particularly in electronic applications, it is desirable to provide flame retardancy to polyesters. One particular set of conditions commonly accepted and used as a standard for flame retardancy is set forth in Underwriters Laboratories, Inc. Bulletin 94, which proscribes certain conditions by which materials are rated for self-extinguishing characteristics. Another set of conditions commonly accepted and used (especially in Europe) as a standard for flame retardancy is the Glow Wire Test (GWT), performed according to the International standard IEC 695-2-1/2.

Numerous flame retardants for polyesters are known, but many contain halogens, usually bromine. Halogenated flame retardant agents are less desirable because of the increasing demand for ecologically friendly ingredients. Also, polyester compositions with halogenated flame retardants typically display poor color stability upon aging under ultraviolet light.

There is a need for polyester compositions having the combination of good flame retardant properties and good color stability upon ultraviolet light aging without the use of halogenated flame retardants and without sacrificing mechanical properties. The compositions taught herein overcome the described deficiencies.

SUMMARY OF INVENTION

The above-described and other drawbacks and disadvantages of the prior art are alleviated by a composition comprising a poly(butylene terephthalate); a nitrogen-containing flame retardant selected from the group consisting of triazines, guanidines, cyanurates, isocyanurates, and mixtures comprising at least one of the foregoing nitrogen-containing flame retardants; and a phosphorus-containing flame retardant selected from the group consisting of diphosphates, phosphoramides, and mixtures comprising at least one of the foregoing phosphorus-containing flame retardants; wherein the weight ratio of the total of the phosphorus-containing flame retardant and the nitrogen-containing flame retardant to the poly(butylene terephthalate) is greater than 0.70.

Other embodiments, including a method of preparing the compositions, are described below.

DETAILED DESCRIPTION

One embodiment is a composition comprising a poly(butylene terephthalate); a nitrogen-containing flame retardant selected from the group consisting of triazines, guanidines, cyanurates, isocyanurates, and mixtures comprising at least one of the foregoing nitrogen-containing flame retardants; and a phosphorus-containing flame retardant selected from the group consisting of diphosphates, phosphoramides, and mixtures comprising at least one of the foregoing phosphorus-containing flame retardants; wherein the weight ratio of the total of the phosphorus-containing flame retardant and the nitrogen-containing flame retardant to the poly(butylene terephthalate) is greater than 0.70.

Preferred poly(butylene terephthalate) polyesters are obtained by copolymerizing a glycol component at least about 70 mole %, preferably at least about 80 mole %, of tetramethylene glycol, and an acid component comprising at least about 70 mole %, preferably at least about 80 mole %, of terephthalic acid, or polyester-forming derivatives thereof. The preferred glycol component may contain up to about 30 mole %, preferably up to about 20 mole % of another glycol, such as ethylene glycol, trimethylene glycol, 2-methyl-1,3-propane glycol, hexamethylene glycol, decamethylene glycol, cyclohexane dimethanol, neopentylene glycol, and the like, and mixtures comprising at least one of the foregoing glycols. The preferred acid component may contain up to about 30 mole %, preferably up to about 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethanedicarboxylic acid, sebacic acid, adipic acid, and the like, and polyester-forming derivatives thereof, and mixtures comprising at least one of the foregoing acids or acid derivatives.

A preferred poly(butylene terephthalate) may have a number average molecular weight of about 10,000 atomic mass units (AMU) to about 200,000 AMU, as measured by gel permeation chromatography using polystyrene standards. Within this range, a number average molecular weight of at least about 20,000 AMU may be preferred. Also within this range, a number average molecular weight of up to about 100,000 AMU may be preferred, and a number average molecular weight of up to about 50,000 AMU may be more preferred.

The poly(butylene terephthalate) may be present in the composition at about 20 to about 60 weight percent, based on the total weight of the composition. Within this range, it may be preferred to use at least about 25 weight percent, even more preferably at least about 30 weight percent of the poly(butylene terephthalate). Also within this range, it may be preferred to use up to about 55 weight percent, more preferably up to about 50 weight percent, yet more preferably up to about 45 weight percent of the poly(butylene terephthalate).

In one embodiment the composition may contain a second polyester resin that is not a poly(butylene terephthalate). For the second polyester, suitable resins include those derived from a $C_2$–$C_{10}$ aliphatic or cycloaliphatic diol, or mixtures thereof, and at least one aromatic dicarboxylic acid. Preferred polyesters are derived from an aliphatic diol and an aromatic dicarboxylic acid having repeating units of the following general formula:

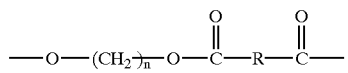

wherein n is an integer of from 2 to 6, and R is a $C_6$–$C_{20}$ divalent aryl radical comprising a decarboxylated residue derived from an aromatic dicarboxylic acid.

Examples of aromatic dicarboxylic acids represented by the decarboxylated residue R are isophthalic acid, terephthalic acid, 1,2-di(p-carboxyphenyl)ethane, 4,4'-dicarboxydiphenyl ether, 4,4' bisbenzoic acid, and the like, and mixtures thereof. All of these acids contain at least one aromatic nucleus. Acids containing fused rings can also be present, such as in 1,4-, 1,5-, or 2,6-naphthalene dicarboxylic acids. Preferred dicarboxylic acids include terephthalic acid, isophthalic acid, naphthalene dicarboxylic acids, and the like, and mixtures comprising at least one of the foregoing dicarboxylic acids.

The aliphatic or alicyclic polyols include glycols, such as ethylene glycol, propylene glycol, butanediol, hydroquinone, resorcinol, trimethylene glycol, 2-methyl-1,3-propane glycol, 1,4-butanediol, hexamethylene glycol, decamethylene glycol, 1,4-cyclohexane dimethanol, or neopentylene glycol.

Also contemplated herein are the above polyesters with minor amounts, e.g., about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. No. 2,465,319 to Whinfield et al., and U.S. Pat. No. 3,047,539 to Pengilly.

Block copolyester resin components are also useful, and can be prepared by the transesterification of (a) straight or branched chain poly(alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the terephthalate units, of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 percent by weight of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like.

The embodiments containing the second polyester resin preferably have the poly(butylene terephthalate) accounting for at least 50 weight percent, and more preferably at least 80 weight percent of the total of the poly(butylene terephthalate) and the second polyester resin.

The flame retardant polyester composition includes a flame retarding quantity of one or a mixture of nitrogen-containing flame retardants such as triazines, guanidines, cyanurates, and isocyanurates. Preferred triazines have the formula

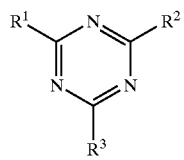

wherein $R^1$, $R^2$, and $R^3$ are independently $C_1$–$C_{12}$alkyl $C_1$–$C_{12}$alkoxyl, $C_6$–$C_{12}$aryl, amino, $C_1$–$C_{12}$alkyl-substituted amino, or hydrogen. Highly preferred triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine(CAS Reg. No. 91-76-9), and the like. Salts/adducts of these compounds with boric acid or phosphoric acid may be used in the composition. Examples include melamine pyrophosphate and melamine polyphosphate. Preferred cyanurate/isocyanurate compounds include salts/adducts of the triazine compounds with cyanuric acid, such as melamine cyanurate.

Preferred guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardant may be present in the composition at about 1 to about 25 weight percent, based on the total weight of the composition. Within this range, it may be preferred to use at least about 5 weight percent, even more preferably at least about 8 weight percent of the nitrogen-containing flame retardant. Also within this range, it may be preferred to use up to about 20 weight percent, more preferably up to about 15 weight percent of the nitrogen-containing flame retardant.

The nitrogen-containing flame retardants are used in combination with one or more phosphorus-containing flame retardants as described below. Suitable phosphorus-containing flame retardants includes those having the formula:

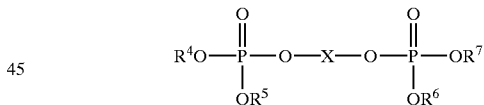

wherein $R^4$–$R^7$ are each independently $C_1$–$C_6$alkyl, $C_6$–$C_{12}$aryl, $C_7$–$C_{12}$aralkyl, or $C_7$–$C_{12}$alkylaryl, for instance those made out of $POCl_3$, a diphenol compound HO—X—OH with X is a group with at least 2 aryl unit (such as bisphenol A), and mono-hydroxy compound(s) $R^4$OH—$R^7$OH that may be the same or different, such as phenol.

A highly preferred phosphorus-containing flame retardant is tetraphenyl bisphenol A-diphosphate.

Other suitable phosphorus-containing flame retardants include phosphoramides having the formula:

wherein $R^8$ is amino, and $R^9$ and $R^{10}$ are independently $C_1$–$C_{12}$alkoxyl, $C_6$–$C_{12}$aryloxyl, or $C_6$–$C_{12}$aryloxyl residue containing at least one alkyl or amino group. It is preferred that the phosphoramides have a glass transition point of at least about 0° C., preferably of at least about 10° C., and more preferably of at least about 20° C.

Other phosphoramides include those having the formula:

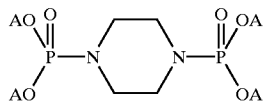

wherein each A is independently phenyl, 2,6-dimethylphenyl, or 2,4,6-trimethylphenyl. A preferred phosphoramide is tetraxylyl piperazine diphosphoramide.

The phosphorus-containing flame retardant may be present in the composition at about 5 to about 45 weight percent, based on the total weight of the composition. Within this range, it may be preferred to use at least about 10 weight percent, even more preferably at least about 15 weight percent of the phosphorus-containing flame retardant. Also within this range, it may be preferred to use up to about 35 weight percent, more preferably up to about 25 weight percent of the phosphorus-containing flame retardant.

In one embodiment, the weight ratio of the phosphorus-containing flame retardant to the nitrogen-containing flame retardant is at least about 1.0, preferably at least about 1.5, and more preferably about 2.0.

In one embodiment the weight ratio of the total of the phosphorus-containing flame retardant and the nitrogen-containing flame retardant to the poly(butylene terephthalate) is greater than 0.70, preferably at least about 0.75, more preferably at least about 0.80. It may be preferred that this ratio is less than about 1.0, and more preferably less than about 0.90, so that the mechanical properties of the composition are not unnecessarily compromised.

Fillers and other additives known in the art may be employed to achieve the desired processing and physical characteristics of the flame retardant polyester composition. Typically, such stabilizers are used at a level of about 0.01 to about 10 weight percent, preferably at a level of about 0.05 to about 2 weight percent, based on the total weight of the composition. Preferred stabilizers may include an effective amount of an acidic phosphate salt; an acid, alkyl, aryl, or mixed phosphite having at least one hydrogen or alkyl group; a Group IB or Group IIB metal phosphate salt; a phosphorous oxo acid, a metal acid pyrophosphate, or a mixture thereof. The acidic phosphate salts include sodium dihydrogen phosphate, mono zinc phosphate, potassium hydrogen phosphate, calcium dihydrogen phosphate, and the like. The phosphites may be of the formula:

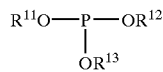

wherein $R^{11}$, $R^{12}$, and $R^{13}$ are independently selected from the group consisting of hydrogen, $C_1$–$C_6$ alkyl, and $C_6$–$C_{12}$ aryl with the proviso that at least one of $R^{11}$, $R^{12}$ and $R^{13}$ is hydrogen or $C_1$–$C_6$ alkyl.

The phosphate salts of a Group IB or Group IIB metal include zinc phosphate, copper phosphate, and the like. The phosphorous oxo acids include phosphorous acid, phosphoric acid, polyphosphoric acid or hypophosphorous acid.

The polyacid pyrophosphates maybe of the formula:

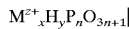

wherein M is a metal, x is a number ranging from 1 to 12 and y is a number ranging 1 to 12, n is a number from 2 to 10, z is a number from 1 to 5 and the sum (xz)+y is equal to n+2.

In a preferred embodiment, the composition is substantially free of a compound having at least two functional groups, the functional groups being epoxy groups, carboxylic acid anhydride groups, isocyanate groups, oxazoline groups, carbodiimido groups, aldehyde groups, carboxyl groups, aziridinyl groups, and cyanate groups. The term "substantially free" is herein defined as limiting the amount of the specified compound to less than about 0.1 weight percent, based on the total weight of the composition. It may be preferred that the compounds having two functional groups are present at less than about 0.01 weight percent, and it is highly preferred that such compounds are not intentionally added to the composition in any amount.

In another embodiment, the composition is substantially free of any non-polyester thermoplastic resin. That is, the composition is substantially free of any thermoplastic resin that is not the above described poly(butylene terephthalate) or second polyester resin.

The compositions may, optionally, further comprise a reinforcing filler. Suitable reinforcing fillers include silica; silicates such as talc or mica; carbon black; and reinforcing fibers, such as carbon fiber, aramide fiber, glass fiber, and the like; and mixtures comprising at least one of the foregoing fillers. In a preferred embodiment, the reinforcing filler comprises glass fibers. For compositions ultimately employed for electrical uses, it is preferred to use fibrous glass fibers comprising lime-aluminum borosilicate glass that is relatively soda free, commonly known as "E" glass. However, other glasses are useful where electrical properties are not so important, e.g., the low soda glass commonly known as "C" glass. The glass fibers may be made by standard processes, such as by steam or air blowing, flame blowing and mechanical pulling. Preferred glass fibers for plastic reinforcement may be made by mechanical pulling. The diameter of the glass fibers is generally about 1 to about 50 micrometers, preferably about 1 to about 20 micrometers. Smaller diameter fibers are generally more expensive, and glass fibers having diameters of about 10 to about 20 micrometers presently offer a desirable balance of cost and performance. The glass fibers may be bundled into fibers and the fibers bundled in turn to yarns, ropes or rovings, or woven into mats, and the like, as is required by the particular end use of the composition. In preparing the molding compositions, it is convenient to use the filamentous glass in the form of chopped strands of about one-eighth to about 2 inches long, which usually results in filament lengths between about 0.0005 to about 0.25 inch in the molded compounds. Such glass fibers are normally supplied by the manufacturers with a surface treatment compatible with the polymer component of the composition, such as a siloxane, titanate, or polyurethane sizing, or the like.

When present in the composition, the reinforcing filler may be used at about 10 to about 60 weight percent, based on the total weight of the composition. Within this range, it may be preferred to use at least about 20 weight percent of the reinforcing filler. Also within this range, it may be preferred to use up to about 50 weight percent, more preferably up to about 40 weight percent, of the reinforcing filler.

The composition may further comprise one or more anti-dripping agents, which prevent or retard the resin from dripping while the resin is subjected to burning conditions. Specific examples of such agents include silicone oils, silica (which also serves as a reinforcing filler), asbestos, and fibrillating-type fluorine-containing polymers. Examples of fluorine-containing polymers include fluorinated polyolefins such as, for example, poly(tetrafluoroethylene), tetrafluoroethylene/hexafluoropropylene copolymers, tetrafluoroethylene/ethylene copolymers, polyvinylidene fluoride, poly(chlorotrifluoroethylene), and the like, and mixtures comprising at least one of the foregoing anti-dripping agents. A preferred anti-dripping agent is poly (tetrafluroethylene). When used, an anti-dripping agent is present in an amount of about 0.02 to about 2 weight percent, and more preferably from about 0.05 to about 1 weight percent, based on the total weight of the composition.

The compositions may, optionally, further comprise other conventional additives used in polyester polymer compositions such as non-reinforcing fillers, stabilizers, mold release agents, plasticizers, and processing aids. Other ingredients, such as dyes, pigments, anti-oxidants, and the like can be added for their conventionally employed purposes.

As the composition is defined as comprising multiple components, it will be understood that each component is chemically distinct, particularly in the instance that a single chemical compound may satisfy the definition of more than one component.

The compositions can be prepared by a number of procedures. In an exemplary process, the polyester composition, optional amorphous additives, impact modifier and filler and/or reinforcing glass is put into an extrusion compounder with resinous components to produce molding pellets. The resins and other ingredients are dispersed in a matrix of the resin in the process. In another procedure, the ingredients and any reinforcing glass are mixed with the resins by dry blending, and then fluxed on a mill and comminuted, or extruded and chopped. The composition and any optional ingredients can also be mixed and directly molded, e.g., by injection or transfer molding techniques. Preferably, all of the ingredients are freed from as much water as possible. In addition, compounding should be carried out to ensure that the residence time in the machine is short; the temperature is carefully controlled; the friction heat is utilized; and an intimate blend between the resin composition and any other ingredients is obtained.

Preferably, the ingredients are pre-compounded, pelletized, and then molded. Pre-compounding can be carried out in conventional equipment. For example, after pre-drying the polyester composition (e.g., for about four hours at about 120° C.), a single screw extruder may be fed with a dry blend of the ingredients, the screw employed having a long transition section to ensure proper melting. Alternatively, a twin screw extruder with intermeshing co-rotating screws may be fed with resin and additives at the feed port and reinforcing additives (and other additives) may be fed downstream. In either case, a generally suitable melt temperature will be about 230° C. to about 300° C.

The pre-compounded composition can be extruded and cut up into molding compounds such as conventional granules, pellets, and the like by standard techniques.

The composition can then be molded in any equipment conventionally used for thermoplastic compositions, such as a Newbury type injection molding machine with conventional cylinder temperatures, at about 230° C. to about 280° C., and conventional mold temperatures at about 55° C. to about 95° C.

In one embodiment, the composition comprises a poly (butylene terephthalate); a nitrogen-containing flame retardant selected from the group consisting of triazines, guanidines, cyanurates, isocyanurates, and mixtures comprising at least one of the foregoing nitrogen-containing flame retardants; and a phosphorus-containing flame retardant selected from the group consisting of diphosphates, phosphoramides, and mixtures comprising at least one of the foregoing phosphorus-containing flame retardants; wherein the composition is substantially free of a compound having at least two functional groups, wherein each functional group is independently selected from the group consisting of epoxy groups, carboxylic acid anhydride groups, isocyanate groups, oxazoline groups, carbodiimido groups, aldehyde groups, carboxyl groups, aziridinyl groups, and cyanate groups.

A preferred thermoplastic composition comprises a poly (butylene terephthalate); a cyanurate or isocyanurate flame retardant; and a diphosphate flame retardant; wherein the weight ratio of the total of the cyanurate or isocyanurate flame retardant and the diphosphate flame retardant to the poly (butylene terephthalate) is greater than about 0.70; and wherein the composition is substantially free of a compound having at least two functional groups, wherein each functional group is independently selected from the group consisting of epoxy groups, carboxylic acid anhydride groups, isocyanate groups, oxazoline groups, carbodiimido groups, aldehyde groups, carboxyl groups, aziridinyl groups, and cyanate groups.

A highly preferred thermoplastic composition comprises about 25 to about 50 weight percent of a poly(butylene terephthalate); about 20 to 40 weight percent of a chopped glass fiber; about 5 to about 20 weight percent of melamine cyanurate; and about 10 to about 35 weight percent of tetraphenyl bisphenol-A diphosphate; wherein the composition is substantially free of a compound having at least two functional groups, wherein each functional group is independently selected from the group consisting of epoxy groups, carboxylic acid anhydride groups, isocyanate groups, oxazoline groups, carbodiimido groups, aldehyde groups, carboxyl groups, aziridinyl groups, and cyanate groups.

In one embodiment the composition consists essentially of a poly(butylene terephthalate); a nitrogen-containing flame retardant selected from the group consisting of triazines, guanidines, cyanurates, isocyanurates, and mixtures comprising at least one of the foregoing nitrogen-containing flame retardants; a phosphorus-containing flame retardant selected from the group consisting of diphosphates, phosphoramides, and mixtures comprising at least one of the foregoing phosphorus-containing flame retardants; glass fibers; and at least one additive selected from the group consisting of stabilizers, anti-oxidants, mold release agents, plasticizers, processing aids, dyes, and pigments. The term "consists essentially of" in intended to exclude components whose presence would affect the flow and/or impact strength properties of the composition.

A preferred thermoplastic composition consists of a poly (butylene terephthalate); a nitrogen-containing flame retardant selected from the group consisting of triazines, guanidines, cyanurates, isocyanurates, and mixtures comprising at least one of the foregoing nitrogen-containing flame retardants; a phosphorus-containing flame retardant selected from the group consisting of diphosphates, phosphoramides, and mixtures comprising at least one of the foregoing phosphorus-containing flame retardants; glass fibers; and at least one additive selected from the group consisting of stabilizers, anti-oxidants, mold release agents, plasticizers, processing aids, dyes, and pigments.

In a preferred embodiment, a method of preparing a polyester composition comprises blending a poly(butylene terephthalate); a nitrogen-containing flame retardant selected from the group consisting of triazines, guanidines, cyanurates, isocyanurates, and mixtures comprising at least one of the foregoing nitrogen-containing flame retardants;

and a phosphorus-containing flame retardant selected from the group consisting of diphosphates, phosphoramides, and mixtures comprising at least one of the foregoing phosphorus-containing flame retardants; wherein the composition is substantially free of a compound having at least two functional groups, wherein the functional group is independently selected from the group consisting of epoxy groups, carboxylic acid anhydride groups, isocyanate groups, oxazoline groups, carbodiimido groups, aldehyde groups, carboxyl groups, aziridinyl groups, and cyanate groups.

The composition provides an excellent balance of impact strength, flame retardance, and color stability to UV light. For example in one embodiment, the composition after molding exhibits an Izod unnotched impact strength of at least about 20 kJ/m$^2$ measured according to ISO 180. In another embodiment, the composition after molding passes the Glow Wire Test according to the International standard IEC 695-2-1/2. In yet another embodiment, the composition after molding has a CIELAB ΔE value of less than about 5 measured according to ASTM G26-A after 500 kilojoules of Xenon irradiation.

An additional preferred embodiment encompasses molded articles made from the composition, such as electric and electronic parts, including, for example, connectors, circuit breakers, and power plugs.

It should be clear that the invention encompasses reaction products of the above described compositions.

The invention is further illustrated by the following non-limiting examples.

EXAMPLE 1, COMPARATIVE EXAMPLES 1 AND 2

All formulations are made by dry-blending of ingredients with the exception of tetraphenyl BPA-diphosphate (BPA-DP) and glass fiber. The blends are subsequently compounded on a Werner-Pfleiderer 25 mm co-rotating extruder, where BPA-DP and glass were fed separately downstream of the blend. The extruder temperature settings (upstream to downstream) were 50-140-265-260-260-260-260-260-275° C.; a vacuum of 0.2 bar was applied and the screw rotation rate was 300 RPM.

Poly(butylene terephthalate) (PBT) was obtained from General Electric Company having a weight average molecular weight of 80,000 atomic mass units (AMU) as measured by gel permeation chromatography using polystyrene standards. Poly (ethylene terephthalate) (PET) was obtained from Eastman as EASTAPAK® PET 9921 W having a weight average molecular weight of 60,000 AMU as measured by gel permeation chromatography using polystyrene standards. PET with a weight average molecular weight of 45,000 AMU was obtained from Catalana de Polimers as Sedapet BR-T. Melamine cyanurate was obtained from DSM as MC25. The concentrate of antimony oxide in PBT (Sb-oxide/PBT) was obtained from Campine S.A as Sb$_2$O$_3$/PBT MB80/20. Tetraphenyl bisphenol Adiphosphate (BPA-DP) was obtained from Albemarle as NcendX P-30. Tetrabromo bisphenol A with 52% Bromine (BC52) was obtained from Great Lakes Chemical as BC-52. A 50:50 w/w blend of polytetrafluoroethylene and styrene acrylonitrile copolymer (TSAN) was obtained from General Electric Company as TSAN. Ethylene vinyl acetate was obtained from Smile Plastics as ELVAX® 760, milled. The hindered phenol antioxidant was obtained from Ciba Geigy as IRGANOX®1010. Zinc phosphate was obtained from Keyser & Mackay as Delaphos 2. Pentaerythritol tetrastearate was obtained from Henkel. Zinc sulfide was obtained from Sachtleben Chemie. Pigment Printex® 85 was obtained from Degussa. Pigment Ultramarine Blue was obtained from Qolor Tech. Pigments SICOPAL® Green and SICOTAN® FG were obtained from as BASF. Chopped glass strand was obtained from Nippon Electric Glass as NEG T120 having a diameter of about 13 micron and a sizing for compatibility with PBT.

Sixty mm×60 mm×1.6 mm plaques were molded on a 35 ton Engel injection molding machine with temperature settings of 245–255–265–265° C. (from throat to nozzle) and a mold temperature of 70° C. for the PBT-based formulations and 80° C. for the PET-based formulation. Prior to molding the pellets were pre-dried at 120° C. for 4 hrs.

Plaques were subjected to up to 2000 kJ of ultraviolet light exposure using the ASTM G26-A accelerated Xenon Arc Weathering protocol. Color measurements were performed on the plaques using a MacBeth CE7000 spectrophotometer and the following test characteristics: Equation-CIE L*a*b*; Illuminant-D65; Observer-10° (specular gloss included). L*a*b* correspond to the color shift versus the reference, and $\Delta E=(\Delta L^2+\Delta a^2+\Delta b^2)^{0.5}$ is the overall color shift versus the reference as shown in Table 2.

The flammability of test specimens is evaluated according to the standard Glow Wire Test (GWT) protocol as performed according to International standard IEC 695-2-1/2. Ratings of 960 GWT indicate test samples with the best resistance to burning, whereas 850 GWT rating is a lower degree of resistance to burning if it failed at 960° C.

Test specimens were evaluated for Izod unnotched Impact strength in accordance with ISO 180, and results are expressed in units of kJ/m$^2$.

Formulations in Table 1 correspond to the test specimens in Table 2.

TABLE 1

| Formulation | Comp. Ex. 1 | Ex. 1 | Comp. Ex. 2 |
|---|---|---|---|
| PBT | 25.25 | 37.99 | 0 |
| PET | 25.25 | 0 | 44.59 |
| Chopped glass strand | 30 | 30 | 30 |
| TSAN | 0.85 | 0 | 0.40 |
| BC52 | 10 | 0 | 0 |
| 80/20 (by weight) Antimony oxide/PBT | 4 | 0 | 0 |
| Ethylene-vinyl acetate | 2 | 0 | 0 |
| Zinc phosphate | 0.6 | 0 | 0 |
| Pentaerylthritol tetrastearate | 0.2 | 0 | 0 |
| BPA-DP | 0 | 20 | 15 |
| Melamine Cyanurate | 0 | 10 | 8 |
| Antioxidant | 0.04 | 0.2 | 0.2 |
| Zinc sulfide | 1.8 | 1.8 | 1.8 |
| Pigment PRINTEX ® 85 | 0.0022 | 0.0022 | 0.0022 |
| Pigment Ultramarine Blue | 0.0032 | 0.0032 | 0.0032 |
| Pigment SICOPAL ® green | 0.0064 | 0.0064 | 0.0064 |
| Pigment SICTOAN ® FG | 0.0024 | 0.0024 | 0.0024 |

TABLE 2

UV Aging Results

| Exposure (kJ) | | Comp. Ex. 1 | Ex. 1 | Comp. Ex. 2 |
|---|---|---|---|---|
| 0-Reference | L | 79.475 | 85.012 | 80.671 |
| | a | −1.056 | −0.887 | −1.260 |
| | b | 0.501 | 2.353 | 1.822 |
| 500 | ΔL* | −6.347 | −2.030 | −2.269 |
| | Δa* | −0.554 | −0.787 | −0.638 |
| | Δb* | 10.455 | 3.507 | 8.000 |

TABLE 2-continued

UV Aging Results

| Exposure (kJ) | | Comp. Ex. 1 | Ex. 1 | Comp. Ex. 2 |
|---|---|---|---|---|
| | ΔE** | 12.244 | 4.128 | 8.34 |
| 1000 | ΔL* | −1.584 | −1.698 | −1.245 |
| | Δa* | −1.387 | −0.897 | −0.490 |
| | Δb* | 8.145 | 4.314 | 7.191 |
| | ΔE** | 8.412 | 4.722 | 7.314 |
| 1500 | ΔL* | −1.369 | −1.307 | −0.839 |
| | Δa* | −1.269 | −0.912 | −0.307 |
| | Δb* | 7.859 | 4.918 | 6.425 |
| | ΔE** | 8.076 | 5.170 | 6.487 |
| 2000 | ΔL* | −0.661 | −1.236 | 1.770 |
| | Δa* | −1.077 | −0.945 | 0.453 |
| | Δb* | 7.091 | 5.040 | −2.171 |
| | ΔE** | 7.202 | 5.274 | 5.853 |

*L, a, b shift vs. reference
**$\Delta E = (\Delta L^2 + \Delta a^2 + \Delta b^2)^{0.5}$ = over all color shift vs. reference Surprisingly, Example 1, containing PBT and nitrogen- and phosphorus-containing flame retardants, exhibits significantly reduced color shift, manifested as lower values of ΔE, versus Comparative Example 1, containing a PET/PBT blend and lacking nitrogen and phosphorus flame retardants, after identical ultraviolet light exposures. Example 1 also shows reduced color shift versus Comparative Example 2, which includes nitrogen-containing and phosphorus-containing flame retardants but uses PET instead of PBT.

EXAMPLES 2 AND 3, COMPARATIVE EXAMPLES 3–5

The experiments of Comparative Examples 3–5 and Example 2 were performed as in Example 1 and Comparative Examples 1–2 above. Table 3 is a comparison of the effect of varying the ratio of phosphorus- to nitrogen-containing flame retardants on physical properties of the resulting compositions. The component identified as "Stab./proc. aids" is a mixture of conventional stabilizers and processing aids. All amounts are percent by weight, based on the total composition.

TABLE 3

Effect of the Ratio of Nitrogen to Phosphorus Flame Retardants

| Formulation | Comp. Ex. 3 | Ex. 2 | Ex. 3 | Comp. Ex. 4 | Comp. Ex. 5 |
|---|---|---|---|---|---|
| PBT | 50.50 | 37.99 | 34.80 | 47.99 | 37.99 |
| Chopped glass | 30 | 30 | 30 | 30 | 30 |
| TSAN | 0.85 | 0 | 0 | 0 | 0 |
| BC52 | 10 | 0 | 0 | 0 | 0 |
| BPA-DP | 0 | 20 | 20 | 10 | 10 |
| Melamine Cyanurate | 0 | 10 | 15 | 10 | 20 |
| 80/20 Sb-oxide/PBT | 4 | 0 | 0 | 0 | 0 |
| Stab./proc. aids | 2.84 | 0.2 | 0.2 | 0.2 | 0.2 |
| Pigments | 1.81 | 1.81 | 0 | 1.81 | 1.81 |
| Ratio P-/N-cmpds | 0 | 2.0 | 1.33 | 1.0 | 0.5 |
| Ratio P + N cmpd/PBT | 0 | 0.79 | 1.01 | 0.67 | 0.79 |
| Izod Unn. (kJ/m²) | 40 | 34 | 23 | 40 | 19 |
| GWT @ 1 mm, 960° C. | Pass | Pass | Pass | Fail | Pass |
| ΔE 500 hours Xenon | 12 | <5 | * | <5 | <5 |

*not measured

As shown in Table 3, the ratio of phosphorus to nitrogen-containing flame retardants have a significant effect on the physical properties of the composition. It was unexpectedly found that when the ratio of the phosphorous to nitrogen flame retardants is greater than about 1.0 and the ratio of the combination of phosphorous and nitrogen flame retardants to PBT is greater than 0.70, the resulting composition has good mechanical properties, good flame retardant performance, and good color stability under ultraviolet light (see Example 2). These results were unexpected because using high loadings of flame retardants in polyester formulations will normally not result in such a good balance of impact strength, flame resistance, and UV-resistance.

It was further unexpectedly found that good properties could be obtained without the need of a surface treated nitrogen-containing flame retardant, treated with a compound having at least two functional groups, such as epoxy groups, carboxylic acid anhydride groups, isocyanate groups, oxazoline groups, carbodiimido groups, aldehyde groups, carboxyl groups, aziridinyl groups, and cyanate groups.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A composition, comprising:
    a poly(butylene terephthalate);
    a nitrogen-containing flame retardant selected from the group consisting of triazines, guanidines, cyanurates, and isocyanurates; and
    a phosphorus-containing flame retardant selected from the group consisting of diphosphates, and phosphoramides;
    wherein the weight ratio of the total of the phosphorus-containing flame retardant and the nitrogen-containing flame retardant to the poly(butylene terephthalate) is greater than 0.70; and wherein the weight ratio of the phosphorus-containing flame retardant to the nitrogen-containing flame retardant is at least 1.0.

2. The composition of claim 1, wherein the poly(butylene terephthalate) is the copolymerization product of (a) a glycol component comprising at least about 70 mole % of tetramethylene glycol, and (b) an aromatic dicarboxylic acid comprising at least about 70 mole % of terephthalic acid.

3. The composition of claim 2, wherein the glycol component comprises up to 30 mole % of an aliphatic or cycloaliphatic glycol selected from the group consisting of ethylene glycol, trimethylene glycol, 2-methyl-1,3-propane glycol, hexamethylene glycol, decamethylene glycol, cyclohexane dimethanol, neopentylene glycol, and mixtures comprising at least one of the foregoing aliphatic or cycloaliphatic glycols.

4. The composition of claim 2, wherein the aromatic dicarboxylic acid comprises up to 30 mole % of an aromatic dicarboxylic acid selected from the group consisting of isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethanedicarboxylic acid, sebacic acid, adipic acid, polyester-forming derivatives thereof, and mixtures comprising at least one of the foregoing aromatic dicarboxylic acids and derivatives.

5. The composition of claim 1, comprising 20 to about 60 weight percent of the poly(butylene terephthalate), based on the total weight of the composition.

6. The composition of claim 1, further comprising a second polyester resin that is not a poly(butylene terephthalate), wherein the poly(butylene terephthalate) accounts for at least 50 weight percent of the total of the poly(butylene terephthalate) and the second polyester resin.

7. The composition of claim 1, further comprising a second polyester resin that is not a poly(butylene terephthalate), wherein the poly(butylene terephthalate) accounts for at least 80 weight percent of the total of the poly(butylene terephthalate) and the second polyester resin.

8. The composition of claim 6, wherein the second polyester resin is the copolymerization product of (a) a $C_2$–$C_{10}$ aliphatic or cycloaliphatic diol, and (b) at least one aromatic dicarboxylic acid.

9. The composition of claim 6, wherein the second polyester resin comprises repeating units of the formula:

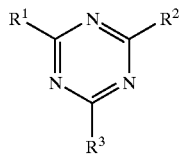

wherein n is an integer of 2 to 6, and R is a $C_6$–$C_{20}$ divalent aryl radical comprising a decarboxylated residue derived from an aromatic dicarboxylic acid.

10. The composition of claim 1, wherein the nitrogen-containing flame retardant has the formula:

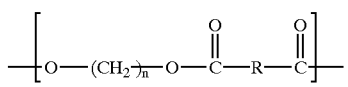

wherein $R^1$, $R^2$, and $R^3$ are independently $C_1$–$C_{12}$alkyl, $C_1$–$C_{12}$alkoxyl, $C_6$–$C_{12}$aryl, amino, $C_1$–$C_{12}$alkyl-substituted amino, or hydrogen.

11. The composition of claim 1, wherein the nitrogen-containing flame retardant is a melamine derivative.

12. The composition of claim 1, wherein the nitrogen-containing flame retardant is selected from the group consisting of 2,4,6-triamine-1,3,5-triazine; melam; melem; melon; ammeline; ammelide; 2-ureidomelamine; benzoguanamine; acetoguanamine; salts of the foregoing flame retardants with cyanuric acid, isocyanuric acid, boric acid, or phosphoric acid; and combinations comprising at least one of the foregoing nitrogen-containing flame retardants.

13. The composition of claim 1, wherein the nitrogen-containing flame retardant is selected from the group consisting of melamine cyanurate, melamine pyrophosphate, melamine polyphosphate, and combinations comprising at least one of the foregoing nitrogen-containing flame retardants.

14. The composition of claim 1, wherein the nitrogen-containing flame retardant is a guanidine.

15. The composition of claim 14, wherein the guanidine is selected from the group consisting of guanidine; aminoguanidine; salts of the foregoing guanidines with boric acid, carbonic acid, phosphoric acid, nitric acid, or sulfuric acid; adducts of the foregoing guanidines with boric acid, carbonic acid, phosphoric acid, nitric acid, or sulfuric acid; and mixtures comprising at least one of the foregoing guanidines.

16. The composition of claim 1, comprising 1 to 25 weight percent of the nitrogen-containing flame retardant, based on the total weight of the composition.

17. The composition of claim 1, wherein the phosphorous containing flame retardant is a diphosphate having the structure

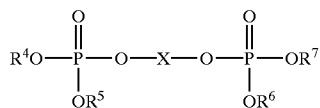

wherein X is a $C_{12}$–$C_{24}$ hydrocarbon group comprising at least 2 aryl units, and $R^4$, $R^5$, $R^6$, and $R^7$ are each independently $C_1$–$C_6$alkyl, $C_6$–$C_{12}$aryl, $C_7$–$C_{12}$aralkyl, or $C_7$–$C_{12}$alkylaryl.

18. The composition of claim 1, wherein the phosphoramide has a formula selected from the group consisting of

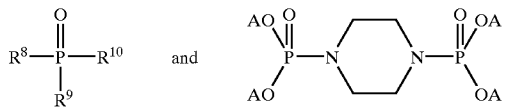

wherein $R^8$ is amino, $R^9$ and $R^{10}$ are independently amino, $C_1$–$C_{12}$ alkoxyl, or $C_6$–$C_{12}$aryloxyl, and each A is independently phenyl, 2,6-dimethylphenyl, or 2,4,6-trimethylphenyl.

19. The composition of claim 1, wherein the phosphorus-containing flame retardant is tetraphenyl bisphenol A-diphosphate, tetraxylyl piperazine diphosphoramide, or a combination thereof.

20. The composition of claim 1, comprising 5 to 45 weight percent of the phosphorus-containing flame retardant, based on the total weight of the composition.

21. The composition of claim 1, further comprising an anti-dripping agent.

22. The composition of claim 21, wherein the anti-dripping agent is selected from the group consisting of silicone oil, silica, asbestos, poly (tetrafluoroethylene), tetrafluoroethylene/hexafluoropropylene copolymers, tetrafluoroethylene/ethylene copolymers, polyvinylidene fluoride, poly (chlorotrifluoroethylene), and combinations comprising at least one of the foregoing anti-dripping agents.

23. The composition of claim 21, wherein the anti-dripping agent is poly (tetrafluoroethylene).

24. The composition of claim 21, comprising 0.02 to 2 weight percent of the anti-dripping agent, based on the total weight of the composition.

25. The composition of claim 1, further comprising 10 to 60 weight percent of a reinforcing filler, based on the total weight of the composition.

26. The composition of claim 25, wherein the reinforcing filler is selected from the group consisting of silica, talc, mica, carbon black, carbon fiber, aramide fiber, glass fiber, and mixtures comprising at least one of the foregoing reinforcing fillers.

27. The composition of claim 26, wherein the reinforcing filler is glass fiber.

28. The composition of claim 1, wherein the composition is free of any non-polyester thermoplastic resin.

29. The composition of claim 1, wherein the composition after molding has an Izod unnotched impact strength of at least 20 kJ/m2 measured according to ISO 180.

30. The composition of claim 1, wherein the composition after molding passes the Glow Wire Test according to the International standard IEC 695-2-1/2.

31. The composition of claim 1, wherein the composition after molding has a CIELAB ΔE value of less than about 5 measured according to ASTM G26-A after 500 kilojoules of Xenon irradiation.

32. A composition, comprising:
a poly(butylene terephthalate);
a cyanurate or isocyanurate flame retardant; and
a diphosphate flame retardant;
wherein the weight ratio of the total of the diphosphate flame retardant and the cyanurate or isocyanurate flame retardant to the poly(butylene terephthalate) is greater than 0.70; and wherein the weight ratio of the diphosphate flame retardant to the cyanurate or isocyanurate flame retardant is at least 1.0.

33. A composition, comprising:
25 to 50 weight percent of a poly(butylene terephthalate);
20 to 40 weight percent of a chopped glass fiber;
5 to 20 weight percent of melamine cyanurate; and
10 to 35 weight percent of tetraphenyl bisphenol-A diphosphate;
wherein the weight ratio of the total of the tetraphenyl bisphenol-A diphosphate and the melamine cyanurate to the poly(butylene terephthalate) is greater than 0.70; and wherein the weight ratio of the tetraphenyl bisphenol-A diphosphate to the melamine cyanurate is at least 1.0.

34. A composition comprising the reaction product of:
a poly(butylene terephthalate);
a nitrogen-containing flame retardant selected from the group consisting of triazines, guanidines, cyanurates, and isocyanurates; and
a phosphorus-containing flame retardant selected from the group consisting of diphosphates, and phosphoramides;
wherein the weight ratio of the total of the phosphorus-containing flame retardant and the nitrogen-containing flame retardant to the poly(butylene terephthalate) is greater than 0.70; and wherein the weight ratio of the phosphorus-containing flame retardant to the nitrogen-containing flame retardant is at least 1.0.

35. A molded article comprising the composition of claim 34.

36. An electrical or electronic device comprising the composition of claim 34.

37. A method for making a composition, comprising:
blending a poly(butylene terephthalate); a nitrogen-containing flame retardant selected from the group consisting of triazines, guanidines, cyanurates, and isocyanurates; and a phosphorus-containing flame retardant selected from the group consisting of diphosphates, and phosphoramides;
wherein the weight ratio of the total of the phosphorus-containing flame retardant and the nitrogen-containing flame retardant to the poly(butylene terephthalate) is greater than 0.70; and wherein weight ratio of the phosphorus-containing flame retardant to the nitrogen-containing flame retardant is at least 1.0.

38. A composition according to claim 1, wherein the weight ratio of the total of the phosphorus-containing flame retardant and the nitrogen-containing flame retardant to the poly(butylene terephthalate) is greater than 0.75.

39. A composition according to claim 1, wherein the weight ratio of the total of the phosphorus-containing flame retardant and the nitrogen-containing flame retardant to the poly(butylene terephthalate) is greater than 0.80.

40. A composition according to claim 1, wherein the weight ratio of the total of the phosphorus-containing flame retardant and the nitrogen-containing flame retardant to the poly(butylene terephthalate) is 0.75 to 1.0.

* * * * *